J. P. PATTERSON.
LAWN MOWER.
APPLICATION FILED JULY 3, 1914.
1,140,526.
Patented May 25, 1915.
3 SHEETS—SHEET 1.
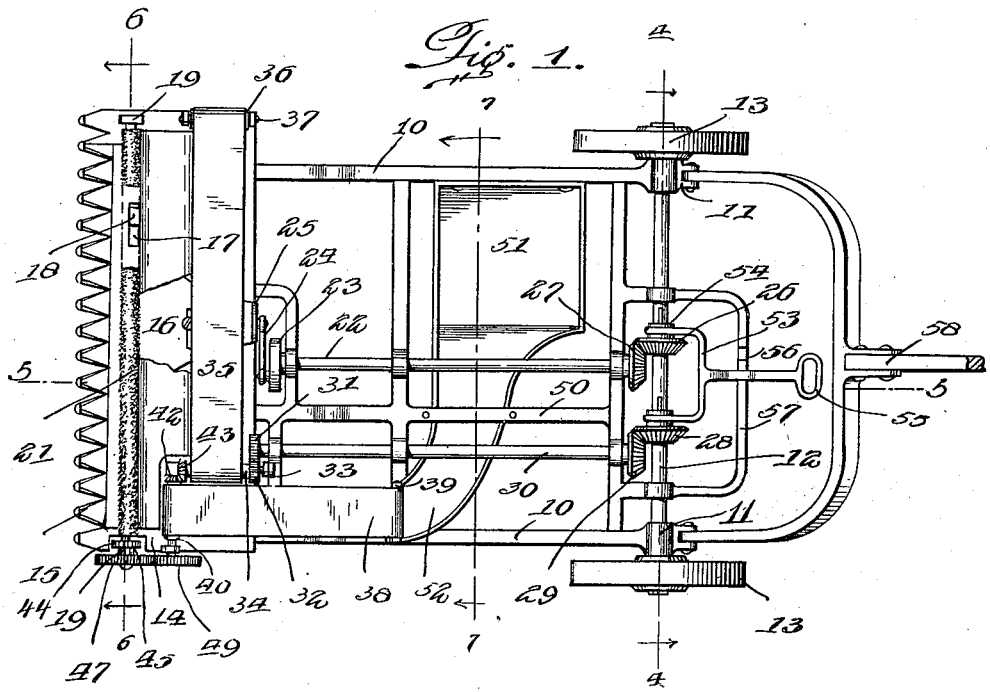
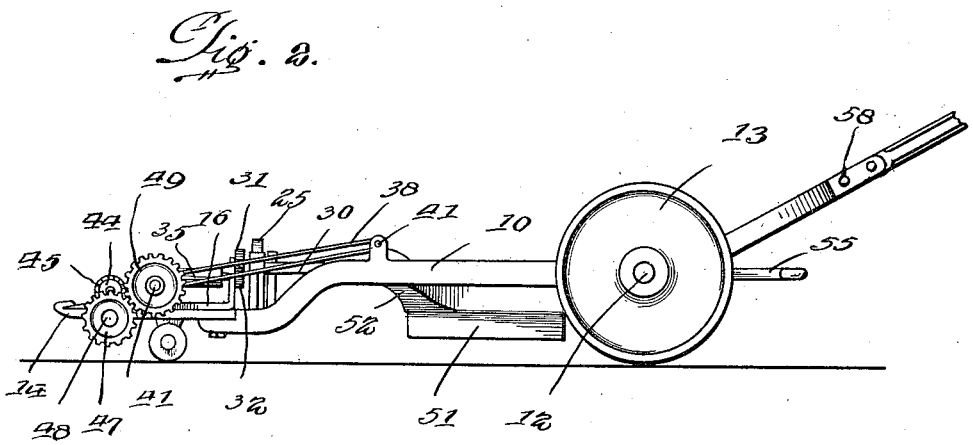
Witnesses
Frederick L. Fox.
Inventor
J. P. Patterson
By Victor J. Evans.
Attorney

J. P. PATTERSON.
LAWN MOWER.
APPLICATION FILED JULY 3, 1914.

1,140,526.

Patented May 25, 1915.
3 SHEETS—SHEET 2.

Inventor
J. P. Patterson.

Witnesses

By Victor J. Evans
Attorney

J. P. PATTERSON.
LAWN MOWER.
APPLICATION FILED JULY 3, 1914.

1,140,526.

Patented May 25, 1915.
3 SHEETS—SHEET 3.

Witnesses
Frederick L. Fox.

Inventor
J. P. Patterson
By Victor J. Evans.
Attorney

UNITED STATES PATENT OFFICE.

JOSEPH P. PATTERSON, OF MILWAUKEE, WISCONSIN.

LAWN-MOWER.

1,140,526.

Specification of Letters Patent. Patented May 25, 1915.

Application filed July 3, 1914. Serial No. 848,897.

*To all whom it may concern:*

Be it known that I, JOSEPH P. PATTERSON, a citizen of the United States, residing at Milwaukee, in the county of Milwaukee and State of Wisconsin, have invented new and useful Improvements in Lawn-Mowers, of which the following is a specification.

The invention relates to mowing machines, and more particularly to the class of lawn mowers.

The primary object of the invention is the provision of a machine of this character wherein the cut grass is conveyed to a receiver or box which is adapted to hold the grass while the mower is active so as to avoid the necessity of raking the lawn after cutting the grass, thus enabling the lawn to be cut and cleaned in a single operation.

Another object of the invention is the provision of a machine of this character wherein the cutting mechanism is under positive control of the operator so that the cutting action can be stopped and started at will, the parts of the machine being of novel form to insure the perfect working thereof.

A further object of the invention is the provision of a machine of this character wherein the cut grass is brushed onto a conveyer which is adapted to feed the grass into a trough, the same directing it to a receiver so that the grass will not fall upon the ground after being cut as the machine advances, thereby keeping the lawn clean.

A still further object of the invention is the provision of a machine of this character which is simple in construction, reliable and efficient in its operation, strong, durable, and inexpensive in manufacture.

With these and other objects in view, the invention consists in the construction, combination and arrangement of parts as will be hereinafter fully described, illustrated in the accompanying drawings, and pointed out in the claims hereunto appended.

Figure 5:
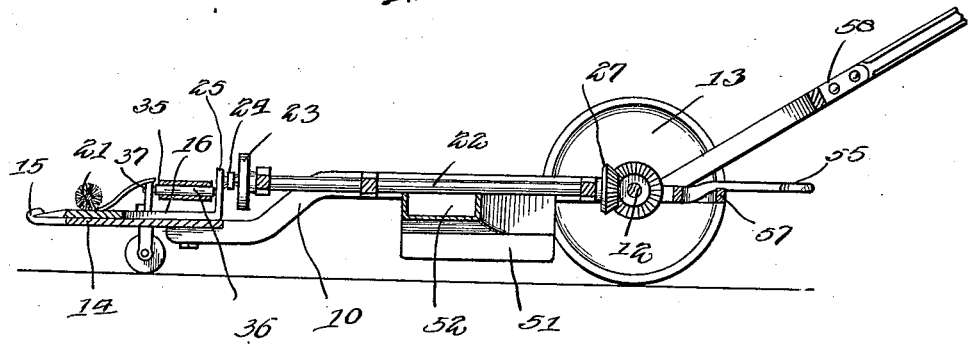
Figure 3:
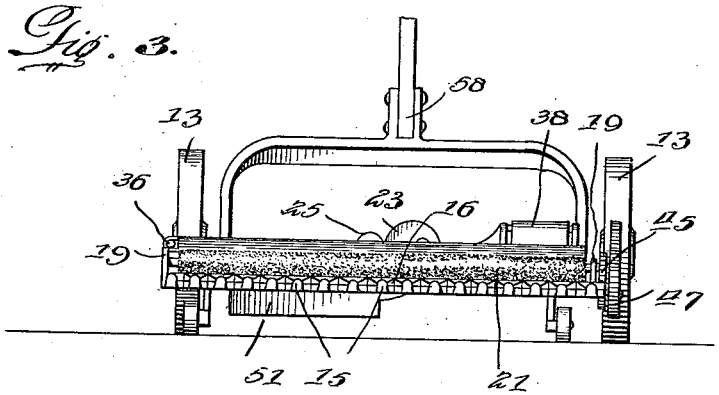
Figure 4:
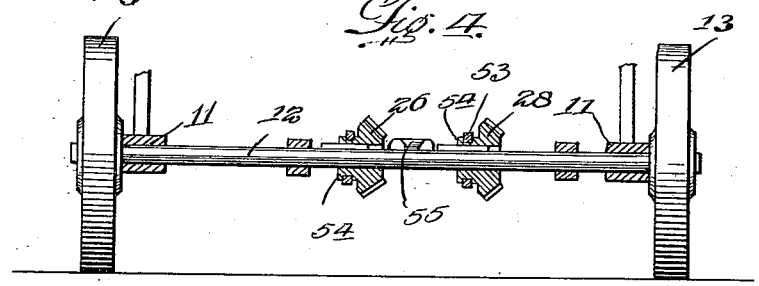
Figure 6:
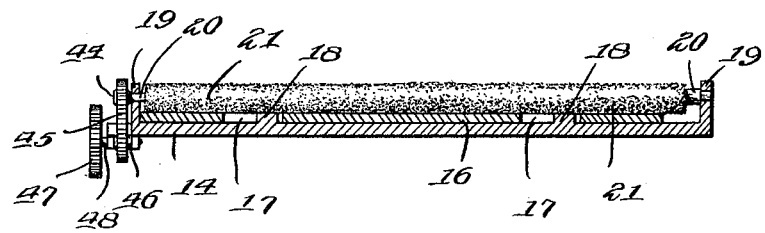
Figure 7:
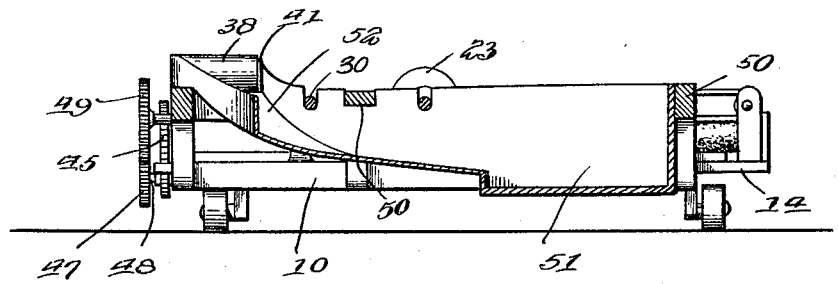
Figure 8:
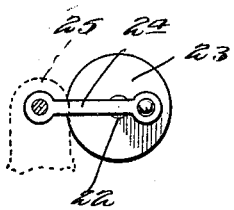

In the drawings:—Figure 1 is a top plan view of a machine constructed in accordance with the invention. Fig. 2 is a side elevation thereof. Fig. 3 is a front elevation. Fig. 4 is a sectional view on the line 4—4 of Fig. 1. Fig. 5 is a vertical longitudinal sectional view through the machine on the line 5—5 of Fig. 1. Fig. 6 is a sectional view on the line 6—6 of Fig. 1. Fig. 7 is a sectional view on the line 7—7 of Fig. 1. Fig. 8 is a fragmentary side elevation showing in detail the eccentric wheel or disk, the throw rod, and the extension on the sickle bar.

Similar reference characters indicate corresponding parts throughout the several views in the drawings.

Referring to the drawings in detail, the mowing machine comprises a main frame 10, which is preferably cast from metal, and is formed with bearings 11 at its rear end, in which is journaled the main or driving shaft 12 forming an axle on which are supported traction wheels 13 which are fixed thereto for the driving of the shaft 12 when the machine is advanced over a lawn. Formed at the front end of the frame is a finger bar 14 carrying the usual fingers 15, and upon this bar 14 is superimposed the reciprocating sickle bar 16 which is formed with slots 17 in which project guide lugs 18 rising from the finger bar for guiding the sickle bar 16 when actuated. Formed at opposite ends of the finger bar 14 are bearings 19 in which is journaled the axle 20 of a rotary brush 21 which is superposed above the sickle or cutting bar 16 and is adapted to brush the grass severed by the said bar 16 rearwardly for a purpose presently described.

Suitably journaled centrally in the frame 10 and extending longitudinally thereof is a driven shaft 22 carrying at its forward end an eccentric wheel or disk 23 on which is concentrically pivoted a throw rod 24, the same being pivoted to an extension 25 formed on the sickle bar 16 so that when the shaft 22 rotates the said bar 16 will be reciprocated on the finger bar for the cutting of the grass when the machine is advanced over a lawn.

Slidably keyed to the driving shaft 12 is a beveled gear 26 adapted for meshing engagement with a beveled pinion 27 fixed on the opposite end of the shaft 22, while slidably keyed to the driving shaft 12 is a further beveled gear 28, the same being adapted to mesh with a beveled pinion 29 fixed to a counter shaft 30, which is suitably journaled in the frame 10 and carries a gear 31 which meshes with a gear 32 fixed to the axle 33 of a belt roller 34, the said axle 33 being suitably journaled upon the frame and is parallel with the counter shaft 30, while trained over this roller 34 is an endless conveyer belt 35, the same being trained over a roller 36 having its axle 37 suitably journaled upon the frame at one end of the finger bar, whereby the conveyer 35 will work transversely of the frame to convey the grass received thereby transversely of the frame.

At one end of the conveyer 35 is a second conveyer comprising a belt 38 trained over rollers 39 and 40, respectively, the axles 41 of which are suitably journaled on the frame, while connected to the axle of the roller 40 is a beveled gear 42 which meshes with a beveled gear 43 fixed to the axle 33 of the roller 34, so that motion from the latter will be imparted to the roller 40 for driving the conveyer 38, which receives the grass from the conveyer 35 and carries it rearwardly of the frame for a purpose presently described.

Fixed to the axle 20 of the brush 21 is a sprocket gear 44 over which is trained an endless sprocket chain 45, the same being also trained over a sprocket wheel 46 fixed to a gear 47 journaled on a stud axle 48 formed at one end of the finger bar 14, and with this gear 47 meshes a gear 49 fixed to the axle 41 of the roller 40 so that motion from the latter will be imparted to the brush 21 for driving the same.

The frame has a plurality of braces 50 which are fixed to the frame in any suitable manner in parallel relation to each other and serve to strengthen the said frame, and supported upon one of these braces 50 is a grass receiver or box 51 which is formed with an entrance trough 52, the same extending to one end of the conveyer 38, so that the grass will be conveyed therefrom into the trough, which directs it into the container or box adapted to hold the same.

The cutter or sickle bar 16 is driven directly from the driving axle 12 through the shaft 22 and gear connections 26 and 27 therebetween. The gears 26 and 28 are adapted to be thrown into and out of mesh with their respective gears 27 and 29, and to accomplish this there is provided a fork 53, the limbs of which are loosely connected with hub extensions 54 on the said gears 26 and 28, the fork being formed with a handle 55 which is adapted to engage in either of a pair of notches 56 formed in a segment 57 mounted on the frame, and by this handle 55 the said gears 26 and 28 can be shifted simultaneously with each other for the starting and stopping of the cutting and conveyer mechanism while the machine is being advanced over a lawn.

Fixed to the rear end of the frame 10 is a handle 58 which enables the pushing of the machine forwardly for its advancement over a lawn. When the machine is moved forward, and the gears 26 and 28 are meshing with the gears 27 and 29 the sickle bar 16 becomes active, and also the conveyers 35 and 38, as well as the brush 21, so that the grass will be cut, the brush 21 being designed to act upon the cut grass to feed the same rearwardly onto the conveyer 35, thence onto the conveyer 38, which will deliver the grass into the trough 52, the same directing it into the receiver 51 which is adapted to collect the cut grass while the machine is active, thereby obviating the necessity of raking the lawn, as the grass will be cut and collected in a single operation of the machine.

What is claimed is:—

1. A lawn mower comprising a frame, a driving shaft journaled at its rear end, traction wheels fixed to said shaft, a finger bar formed at the front end of the frame, a reciprocating sickle bar working upon said finger bar, bearings at opposite ends of the finger bar, a rotary brush journaled in said bearings and superposed above the sickle bar, a driven shaft journaled centrally in the frame, connections between the driven shaft and the sickle bar, a second driven shaft journaled in the frame, a trough supported by the frame and having a curvilinear chute directed laterally and forwardly of the said frame, independent conveyer means, one of said conveyer means arranged transversely of the frame rearwardly of the sickle bar, the other conveyer means arranged longitudinally of the frame and extending from the forward end of the chute and beyond one end of the first-named conveyer means so as to lie at right angles thereto, and connections between the brush, the said conveyer means and the second-named shaft.

2. A lawn mower comprising a frame, a driving shaft journaled at its rear end, traction wheels fixed to said shaft, a finger bar formed at the front end of the frame, a reciprocating sickle bar working upon said finger bar, bearings at opposite ends of the finger bar, a rotary brush journaled in said bearings and superposed above the sickle bar, a driven shaft journaled centrally in the frame, connections between the driven shaft and the sickle bar, a second driven shaft journaled in the frame, a trough supported by the frame and having a curvilinear chute directed laterally and forwardly of the said frame, independent conveyer means, one of said conveyer means arranged transversely of the frame rearwardly of the sickle bar, the other conveyer means arranged longitudinally of the frame and extending from the forward end of the chute and beyond one end of the first-named conveyer means so as to lie at right angles thereto, connections between the brush, the said conveyer means and the second-named shaft, and connection between the first and second-named driven shafts and the driving shaft.

3. A lawn mower comprising a frame, a driving shaft journaled at its rear end, traction wheels fixed to said shaft, a finger bar formed at the front end of the frame, a reciprocating sickle bar working upon said finger bar, bearings at opposite ends of the finger bar, a rotary brush journaled in said bearings and superposed above the sickle bar, a driven shaft journaled centrally in the frame, connections between the driven shaft and the sickle bar, a second driven shaft journaled in the frame, a trough supported by the frame and having a curvilinear chute directed laterally and forwardly of the said frame, independent conveyer means, one of said conveyer means arranged transversely of the frame rearwardly of the sickle bar, the other conveyer means arranged longitudinally of the frame and extending from the forward end of the chute and beyond one end of the first-named conveyer means so as to lie at right angles thereto, connections between the brush, the said conveyer means and the second-named shaft, connection between the first and second-named driven shafts and the driving shaft, and hand operated means for throwing out the connections between the said shafts simultaneously with each other.

In testimony whereof I affix my signature in presence of two witnesses.

JOSEPH P. PATTERSON.

Witnesses:
 WM. J. GLEESON,
 JOHN J. MORRIS.

Copies of this patent may be obtained for five cents each, by addressing the "Commissioner of Patents, Washington, D. C."